Dec. 6, 1927.     1,651,379
W. H. DOUGLAS
UNIVERSAL JOINT
Filed Nov. 1, 1926

INVENTOR
WILLIAM H. DOUGLAS
ATTORNEY

Patented Dec. 6, 1927.

1,651,379

UNITED STATES PATENT OFFICE.

WILLIAM H. DOUGLAS, OF KEYPORT, NEW JERSEY, ASSIGNOR TO HEALEY-AERO-MARINE BUS COMPANY, INC., A CORPORATION OF NEW YORK.

UNIVERSAL JOINT.

Application filed November 1, 1926. Serial No. 145,555.

This invention relates in general to universal joints and more specifically to a control means for a type of joint adapted to maintain a constant velocity ratio between a driving and a driven member, in which type there is usually employed one or more intermediate members articulated to the driving and driven members respectively. The present embodiment discloses a compact form of joint particularly adapted to operate at extremely large angles under high power conditions such as are exemplified in the driving of a steerable vehicle wheel, and there is featured herein a new and novel control means that is journalled in the intermediate member; thus providing a compact and powerful joint structure of moderate over-all dimensions having special advantages to be hereinafter described.

It is well known that in the type of joints referred to, constant velocity ratio can only be maintained if the intermediate member is restrained at all times to a plane bisecting the angle between the driving and driven members. Various forms of controlling devices to attain this object are known in the art. Many of these devices are theoretically correct as to mode of operation, but are disproportionately weak as to their structure and bearings as compared with the joint structure with which they are associated.

When high angles between the shafts are encountered, a large proportion of the driving torque reacts upon the intermediate member tending to force it out of the desired plane of bisection between the shafts. This relatively powerful action must be resisted by the controlling member, which accordingly needs to have the same order of strength and rigidity as is necessary in the joint itself.

Most of the controlling members of the prior art include a hinged connection between a pair of arms so as to permit angular movement of one arm relative to the other as induced by the driving and driven members to which the ends of these arms are articulated. As said before these controlling members as a whole must have the same order of strength and rigidity as the joint itself, and to this end it is advantageous to reduce the number of parts in such a control member to a minimum.

Accordingly this invention features a simplified form of controller comprising only one element, said element also having two arms or extensions but which in this instance are not hinged for relative angular movement. In the present embodiment one of these arms or extensions is articulated to one of the driving members whilst the opposite extension has a transaxial sliding connection with the other driving member, said connection being of such construction as to permit slight oscillation at this juncture. The simplicity and relative ruggedness of the present form of controller will be at once apparent from the drawings.

One of the objects of the invention is to provide an improved form of controller for a universal joint that is of such construction as to eliminate the usual hinge connection.

A further object of the invention is to provide an improved form of controller of such simple construction as to permit of the same being readily fabricated from a single piece of material.

Various other objects and advantages of the invention will be in part obvious from an inspection of the accompanying drawings. The invention consists of certain new and special features of construction and combination of parts hereinafter set forth and claimed.

Figure 1:
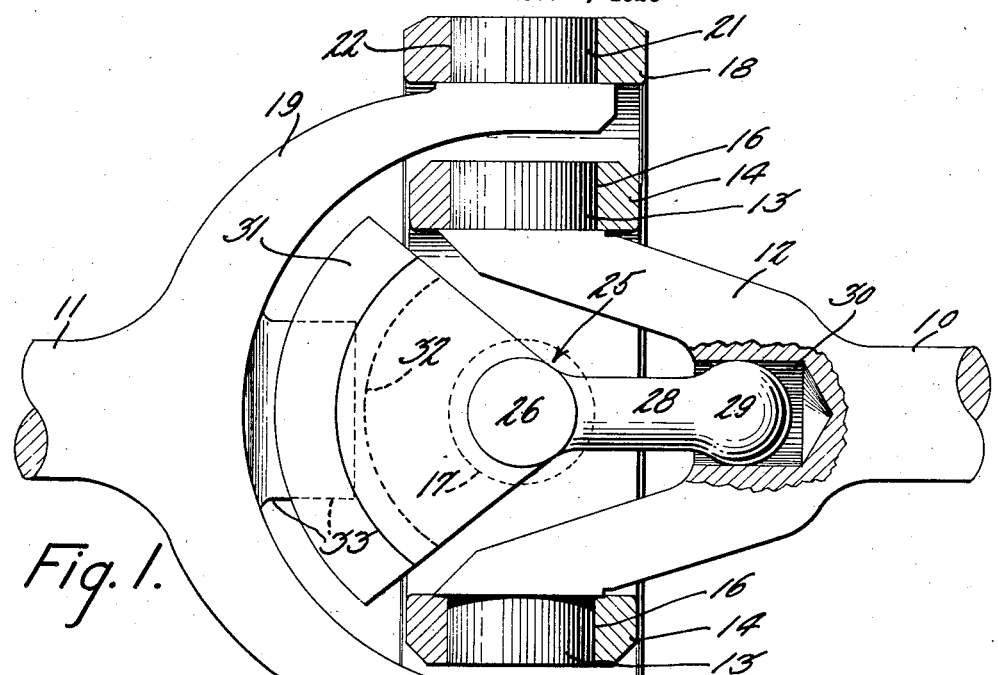
Figure 1 is a horizontal section of a universal joint showing the improved form of controller connected thereto.

With reference to the drawings, 10 designates a drive shaft operatively connected to the driven shaft 11 by a form of universal joint requiring a control member such as constitutes the subject matter of this invention.

The shafts 10 and 11 are illustrated in the drawings as not supported in bearings for the purpose of featuring the possibility of angular deflection therebetween. It is obvious however, that either or both of said shafts may be mounted in fixed bearings, or supported in a manner as to permit of the angular movement of one shaft relative the other as would be the case for example if the shaft 11 were replaced by a member for driving a steerable wheel.

The drive shaft 10 is bifurcated as at 12 and is provided with cross pins 13. Upon the cross pins 13 there is mounted for oscillation an inner intermediate ring member 14 provided with bores 16 in which the cross pins are disposed. This member 14 is further provided with a pair of hollow trunnions 17, (Fig. 2) disposed transaxially of the bores 16, and engaging for oscillation an outer intermediate ring member 18.

The driven shaft 11 is provided with a U-shaped yoke 19 conveniently formed integral with the shaft in the present showing, said yoke 19 being provided with cross pins 21 which engage in the bores 22 of the outer ring 18 in an oscillatory manner. From this construction it will be seen that the rings 14, 18 are pivoted together for relative rotary movement about the axis of the trunnions which connect the rings with their respective shafts. It will be noted that the outer and the inner ring members 14 and 18 form a conventional gimbal ring structure adapted to transmit torque from one shaft to the other and it is in this or an equivalent structure that my improved control means will be found advantageous.

In compound joints of the type illustrated, it is necessary in order to realize constant velocity ratio, to control the attitude of the intermediate ring members 14, 18. The swing of the inner member 14 on the drive shaft cross pins 13, must always be one-half of the angular deflection of the drive shaft 10 (in the same plane) relative to the driven shaft 11. As shown in the drawings there is provided in the present instance a relatively rugged control member of such improved structure as to secure maximum strength and rigidity without increase in the overall dimensions thereof.

Accordingly there is slidably mounted in the hollow trunnions 17 of the inner intermediate member 14, a one-piece cruciform controlling member 25 comprising journal portions 26 and 27 said journal portions being adapted to fit within the hollow trunnions 17 of the inner ring 14 for sliding and oscillation.

Intermediate the ends of the journal portions and integral therewith is disposed a laterally extending arm 28 enlarged at its extremity 29 which is of spherical formation, said extremity being slidably engaged in a bore 30 formed in the shaft 10. Opposite to the arm 28 there is formed a segmental portion 31 also integral with the journals 26, 27, that is provided with an arcuate slot 32 in which is engaged for sliding and oscillation a cylindrical portion 33 formed on the yoke 19.

It will be apparent that the segmental portion 31 is free to travel in either direction with the shaft 10 about the axis of the journals 26 and 27, and that the controller as a whole performs the same function as one having a hinged connection whilst providing a highly fortified structure fabricated in one piece.

Figure 3:
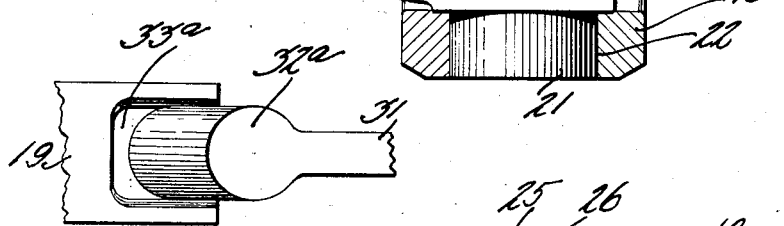
Figure 3 is a fragmentary view of an alternative form of connection between several engaging parts.
Figure 2:
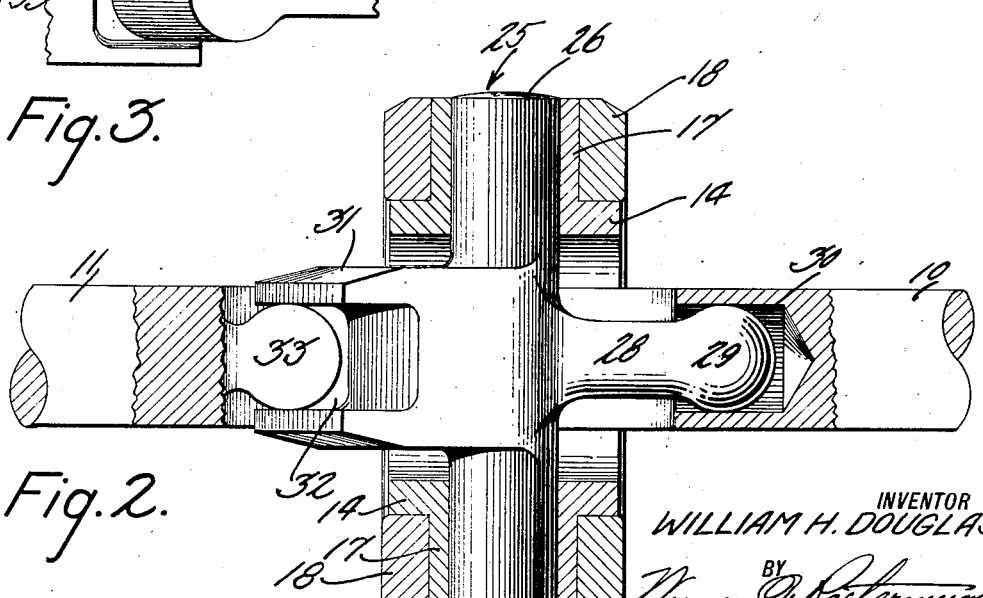
Figure 2 is a vertical section of the parts shown in Fig. 1.

With reference to Fig. 3 there is shown an alternative connection in which the segmental portion 31 above referred to is provided with an arcuate cylindrical portion $32^a$ in place of slot 32 of Figs. 1 and 2, the yoke 19 being provided in this particular instance with a groove $33^a$ in which the portion $32^a$ is slidably engaged.

Variations may be resorted to within the scope of the invention and portions of the improvements may be used without the others.

Having thus described my invention, I claim:—

1. In a universal joint connecting a pair of drive members, a control means for the joint comprising an element journalled in the joint and provided with a pair of laterally extending arms rigid therewith; one of said arms connected to one of said drive members for oscillation and angular movement therewith; the other of said arms being connected to the other of said drive members for angular movement relatively thereto.

2. In a universal joint connecting a pair of drive members, a control means for the joint comprising an element having axially aligned journals engaged in the joint, a portion laterally extending from said journals and articulated to one of said drive members, and a segmental portion laterally extending from said journals and slidably engaging the other of said drive members.

3. In a joint of the character described for connecting a driving and a driven member, a control means for the joint comprising a one-piece member slidably journalled in bores of the joint for relative oscillation; said member being provided with integral laterally extending limb portions engaging the driving and driven members respectively; one of said limb portions having engagement therewith by means of a ball and socket connection and the other by means of an arcuate sliding connection.

4. The combination with a universal joint having a driving and a driven shaft and a pair of intermediate members, of a non-driving connection between the shafts and the intermediate members adapted to maintain one of said members in a plane bisecting the angle between the axes of the shafts and comprising, an element having journals supported for oscillation and sliding in one of said intermediate members, an integral limb portion extending laterally from said element and articulated to one of said shafts, and a further integral limb portion extending laterally from said element and having a transaxial sliding engagement with the other of said shafts.

5. The combination with a universal joint having a driving and a driven shaft adapted for relative angular deflection and an intermediate drive transmitting connection including a means provided with spaced apart bearings, of a control means for said drive transmitting connection comprising a member having axially aligned journals engaged in said bearings, a portion laterally extended from said member and having connection with one of said shafts, a further portion laterally extended from said member and having connection with the other of said shafts, said member including both of said portions being rotatable as a unit about the axes of said journals by the angular deflection of one of said shafts.

6. A control means for a universal joint connecting a driving and a driven shaft, said control means comprising a one-piece member journalled in said joint and provided with rigid laterally extending portions respectively engaging the driving and driven shafts; said one-piece member being adapted for oscillation of its extended portions; said oscillation being effected by the angular displacement of one of said shafts.

7. The combination with a universal joint connecting a pair of drive members for unitary rotation, of a control means for the joint comprising, an element provided with axially aligned journals mounted for oscillation and axial movement in said joint, a laterally extending arm integral with said journals and having its extremity articulated to one of said drive members, a laterally extending segmental portion also integral with said journals and provided with a circumferential groove adapted to be slidably engaged by the other of said drive members.

8. The combination with a universal joint connecting a pair of drive members for unitary rotation, of a control means for the joint comprising, an element provided with axially aligned journals mounted for oscillation and axial movement in said joint, a laterally extending arm integral with said journals, said arm having a spherical end portion articulated to one of said drive members, a laterally extending segmental portion also integral with said journals and provided with a circumferential groove, and an extension formed on the other of said drive members to slidably engage the segmental portion by means of said groove.

Signed at Keyport, in the county of Monmouth and State of New Jersey, this 29th day of October, A. D. 1926.

WM. H. DOUGLAS.